United States Patent

[11] 3,619,810

| | | |
|---|---|---|
| [72] | Inventor | Wayne S. Mefferd<br>Palo Alto, Calif. |
| [21] | Appl. No. | 753,684 |
| [22] | Filed | Aug. 19, 1968 |
| [45] | Patented | Nov. 9, 1971 |
| [73] | Assignee | Coherent Radiation Laboratories, Inc.<br>Palo Alto, Calif. |

[54] ION LASER CORE
1 Claim, 2 Drawing Figs.

[52] U.S. Cl. .................................................. 331/94.5
[51] Int. Cl. .................................................. H01s 3/00
[50] Field of Search .................................... 331/94.5;
65/110; 29/447

[56] References Cited
UNITED STATES PATENTS

| 3,437,950 | 4/1969 | Okaya et al. | 331/94.5 |
| 3,447,098 | 5/1969 | Eckberg | 331/94.5 |

OTHER REFERENCES

" Construction of Long Life Argon Lasers," K. G. Hernqvist & J. R. Fendley, Jr. IEEE Journal of Quantum Electronics Vol. QE 3 No. 2, Feb. 1967 pg. 66– 72.

Primary Examiner—Ronald L. Wibert
Assistant Examiner—V. P. McGraw
Attorney—Limbach, Limbach & Sutton ABSTRACT: An ion laser core and method of making the same where the core is formed of a plurality of spaced-apart graphite blocks containing aligned central bores on the optical axis of a laser tube. The graphite blocks are keyed to the tube so that the blocks do not rotate, and the tube is shrunk fit onto the the peripheries of the graphite blocks. Shrink fitting is accomplished by supporting the graphite blocks on a wire which is held under tension while a vacuum is drawn on the interior of the tube and the tube is heated to a temperature at which it flows.

PATENTED NOV 9 1971          3,619,810

INVENTOR.
WAYNE S. MEFFERD
BY Limbach & Limbach
ATTORNEYS

ION LASER CORE

BACKGROUND OF INVENTION

The use of graphite core blocks for the core of ion lasers is disclosed in an article written by K. G. Hernqvist and J. R. Fendley, Jr. in the "IEEE Journal of Quantum Electronics," Feb. 1967. Various problems are encountered in physically supporting graphite blocks in the laser tube where it is desirable to have the blocks very accurately positioned on the optical axis of the tube and where it is desirable to employ a minimum number of parts inside the tube. I have found that the graphite core blocks may be mounted very precisely in the laser tube by a very inexpensive and efficient method by shrink fitting the laser tube itself directly onto the peripheries of the graphite blocks. This may be accomplished by supporting the graphite blocks in their intended physical configuration inside the laser tube and heating the laser tube to a temperature at which the material from which the tube is made flows while applying a greater pressure to the exterior of the tube than the interior until the material of the tube flows into engagement with the graphite blocks.

The core structure formed in this way is symmetrical about the axis of the tube, and for this reason, one might expect that the graphite blocks could be mounted in such a way that it would be possible for them to rotate about the axis of the tube. We have discovered, however, that the graphite blocks should be directly keyed to the wall of the tube to prevent them from rotating since rotation of the core blocks may cause destruction of the tube itself.

Thus, where the core structure is made in accordance with the method of this invention by shrink fitting the tube onto the core blocks, the internal wall surfaces of the tube are positioned very close to the exterior surfaces of the graphite blocks. A small clearance is provided between these two surfaces because of the thermal expansion characteristics of the materials. The graphite blocks have a very high coefficient of thermal expansion which is higher than the coefficient expansion of the material used for formation of the tube. For this reason, the process of shrink fitting brings the internal surface of the tube and external surfaces of the graphite blocks into direct contact at the temperature at which shrink fitting takes place, that is, at a high enough temperature where the material from which the tube is formed becomes plastic. This temperature of shrink fitting is higher than the operating temperature of the parts during operation of the laser, and accordingly, the graphite blocks do not expand thermally during normal operation of the laser to the diameter which they occupied at the time the laser tube was shrunk fit onto them so that thermal expansion of the graphite blocks during operation of the laser does not damage the tube.

The graphite blocks must be prevented from rotating inside the tube so that thermal expansion of the blocks does not rupture the tube where the blocks contain any lack of symmetry. Thus, I have found that laser tubes have been broken where the end faces of the graphite blocks were nonparallel and were permitted to rotate in a shrunk fit laser tube.

Other features and advantages of the invention will become apparent from the following description read in conjunction with the attached drawing in which:

FIG. 1 is a central cross-sectional view through a laser tube constructed in accordance with this invention; and FIG. 2 is a longitudinal sectional view of the laser of FIG. 1 taken along the plane indicated at 2—2 in FIG. 2.

DETAILED DESCRIPTION

Figure 1:
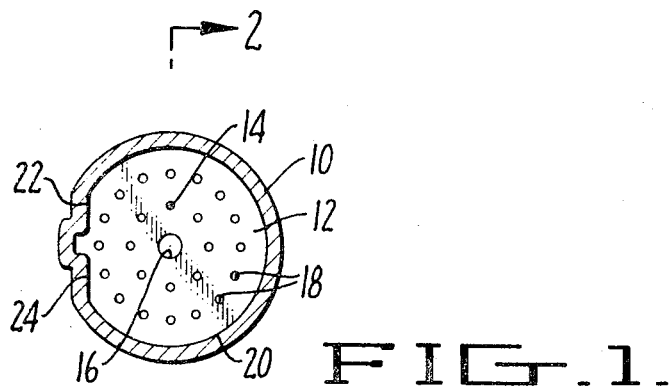
Figure 2:
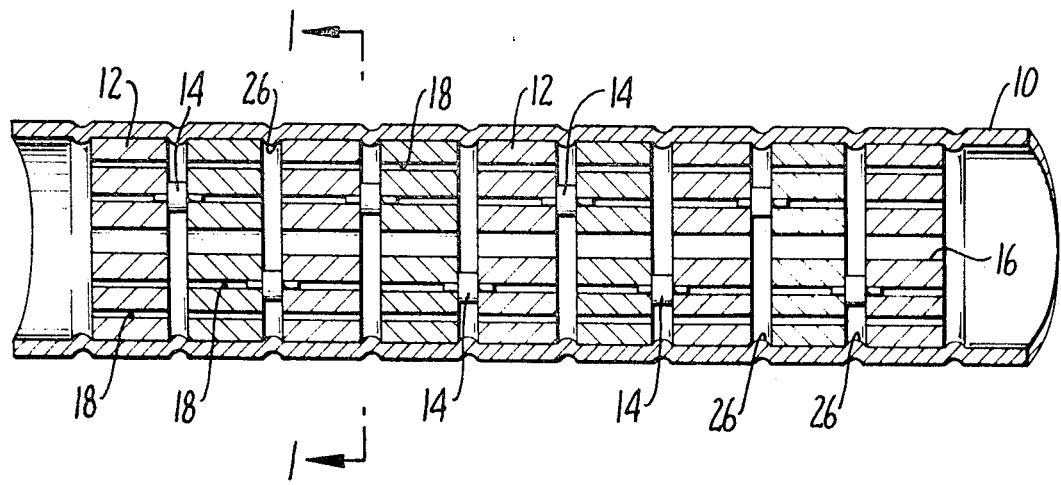

Referring now in detail to the drawings, the laser tube illustrated therein comprises an outer tube 10 formed of a thermoplastic ceramic material such as fused quartz containing a plurality of graphite blocks 12 separated by dielectric ceramic spacers 14. The graphite blocks contain aligned central bores 16 through which the gas discharge of the tube passes and a plurality of radially spaced gas passageways 18 through which the gas medium in the laser tube may flow from one end of the tube to the other to relieve the effect of ion pumping. The spacers 14 are formed as thin ceramic discs containing protruding ceramic nipples that fit into certain of the gas passageways 18 to hold the spacers in place.

As illustrated in FIG. 1, each of the ceramic blocks 12 has a cylindrical circumferential surface 20 which extends around approximately 330° of the circumference of the blocks 12. In the remaining 30° of the circumference of the blocks 12, the blocks are cut away in two axially extending areas 22 and 24 to define a key portion of the blocks. As explained in greater detail hereinafter, the tube 10 is shrunk fit onto the blocks 12 so that the interior surfaces of the tube 10 embrace the circumferential portion 20 and key portion 22–24 of the blocks, and the tube 10 extends radially into the space between blocks as illustrated at 26 so that the blocks are supported by the tube both against axial and circumferential movement.

In accordance with the method of this invention, the graphite blocks are physically supported in an independent position inside the tube and physically supported independently of the tube while the tube is heated to a temperature at which the material of the tube flows and while the greater pressure is applied to the exterior of the tube than to the interior. The physical support for the graphite blocks is preferably provided by mounting the blocks on a metal wire which will retain its structural strength at the temperature of shrink fitting, preferably a wire made of tungsten. The tungsten wire is maintained under tension during the period when the tube is heated to its flow temperature. The application of pressure differential to the wall of the tube is preferably accomplished by evacuating the tube while the periphery of the tube adjacent to the graphite blocks is heated.

The method of making the laser core structure in accordance with this invention may be performed on a glass lathe with tubes supported at both of its ends for rotation in the lathe while the graphite blocks are supported on a tungsten wires maintained under tension in the tube. One end of the tube may be sealed and a vacuum pump connected to the other end, and the tube is rotated in the lathe while heat is applied to the exterior of the tube first near one end of the group of graphite blocks and progressing slowly to the other end of the group. The heating is performed sufficiently intently and slowly that the temperature of the graphite blocks is raised to an equilibrium temperature above their operating temperature during normal operation of the laser in which they are to be used.

While one specific embodiment of the invention has been illustrated and described in detail herein, it is obvious that many modifications thereof may be made without departing from the spirit and scope of the invention.

I claim:

1. In an ion laser having an optical axis and means for establishing a gas discharge along said axis, the improved core structure which comprises:
   - A. A plurality of graphite blocks mounted along said axis with each of said blocks having;
     1. right and left end faces facing generally parallel to said axis;
     2. a generally cylindrical circumferential surface extending around said axis;
     3. a key portion extending less than 360° around said axis, and having key surfaces extending away from said circumferential surface;
     4. a central bore extending along said axis and adapted to pass said gas discharge therethrough; and,
     5. a plurality of gas passageways radially spaced from said axis and extending between said right and left faces;
   - B. A plurality of spacers extending between the adjacent right and left faces of said blocks for holding said blocks apart with said spacers formed of a dielectric material; and,
   - C. An elongated tubular envelope formed of thermoplastic ceramic material surrounding the peripheries of said blocks and shrunk fit onto said blocks with said envelope engaging said cylindrical circumferential surfaces and said key surfaces of said blocks for preventing rotation of said blocks around said axis, and with said envelope having annular portions thereof extending radially inwardly toward said axis from said circumferential portions of said blocks for preventing movement of said blocks along said axis.

* * * * *